United States Patent
Goldberg

[15] 3,674,291
[45] July 4, 1972

[54] FLANGE FOR CONDUIT COUPLING

[72] Inventor: Leonard Z. Goldberg, Canoga Park, Calif.

[73] Assignee: Lockheed Aircraft Corporation, Burbank, Calif.

[22] Filed: Nov. 30, 1970

[21] Appl. No.: 93,796

[52] U.S. Cl.................................285/367, 285/286, 285/328
[51] Int. Cl..........................................F16l 19/00
[58] Field of Search..................285/367, 410, 366, 365, 328, 285/407, 408, 409, 411, 406, 99

[56] References Cited

UNITED STATES PATENTS

| | | | |
|---|---|---|---|
| 2,896,978 | 7/1959 | Schumacher | 285/408 |
| 2,628,851 | 2/1953 | Jessup | 285/367 X |
| 3,455,582 | 7/1969 | Von Hoevel | 285/367 X |
| 2,937,893 | 5/1960 | Hill et al. | 285/410 X |
| 2,489,587 | 11/1949 | Rice | 285/367 |
| 2,548,216 | 4/1951 | Houghton et al. | 285/367 X |

FOREIGN PATENTS OR APPLICATIONS

| | | | |
|---|---|---|---|
| 890,588 | 9/1953 | Germany | 285/365 |

*Primary Examiner*—Andrew V. Kundrat
*Attorney*—George C. Sullivan and Lowell G. Turner

[57] ABSTRACT

A flange is provided which includes a divergent-reentrant portion extending from a collar, the reentrant segment depending in an axially and outwardly distended spring relationship relative to the balance of the flange and being adapted to mate in a sealing relationship with a similar segment upon an adjacently oriented flange. A reinforcing ring fixed to an inner periphery of the collar extends toward and into close proximity with a rearward face of the reentrant segment for engagement therewith to prevent overstressing of the reentrant segment. Two such flanges are mated and secured in their relative positions by a clamp to facilitate a fluid seal.

10 Claims, 6 Drawing Figures

PATENTED JUL 4 1972 3,674,291

LEONARD Z. GOLDBERG
INVENTOR.

BY George C. Sullivan
Lowell G. Turner
Agents

FLANGE FOR CONDUIT COUPLING

BACKGROUND OF THE INVENTION

1. Field of the Invention

The present invention relates to a flange for use in the coupling of fluid conduits, its primary utilization being in pneumatic systems, particularly as related to environmental control systems. It is a low weight, low-to-high temperature structure highly resistant to flange injury or over-stressing tendencies under rough handling and highly pressurized environments.

2. Description of the Prior Art

Pneumatic and hydraulic systems in operational vehicles and in various static applications have long been subjected to operation under highly adverse environmental conditions. Throughout the history of the development of such systems a large and structurally varying number of flanges have been designed in an effort to meet the demanding requirements of such applications. Designers of prior art devices have recognized that where the demands of such systems require that the flanges operate over temperature ranges from below zero to several hundred degrees fahrenheit, great care must be exercised in the design and construction of the structural elements. It has also been generally recognized that such broad temperature regimes require that materials must be carefully selected. In general, it has been determined that non-metallic materials should be eliminated from extremely high temperature structures to assure operability.

The noted requirements were recognized by inventor Schumacher in his design of the flanged pipe coupling described in U.S. Pat. No. 2,896,978, wherein he provided a pair of reentrant flanges upon the ends of conduits and mated by a coupling of substantially the character utilized for that purpose in the present character utilized for that purpose in the present invention.

Similarly, the patent to Hill et al., U.S. Pat No. 2,937,893, is directed to a structure having substantially the same characteristics. Each of these patents teaches the use of all metal element, their uses in systems wherein wide temperature excursions may be encountered being thereby enhanced. The abutting and sealing end surface 16 of the Hill et al. patent also teaches the tapering of that surface so as to facilitate deflection and effective sealing between it and the mating face 16 prime of its companion flange.

Although flanges of the described character have been fairly effective in accomplishing their high temperature sealing functions, difficulty has been encountered in both their assembly and their operation due to the somewhat severe vulnerability of the reentrant flange portions. For example, while the flanges are being handled by the mechanic and other workers prior to their assembly, particularly where the mechanic is somewhat careless in such handling, a bumping of that flange portion against other structure or its being struck by tools, etc., has often been found to result in that portion being sprung. It has also been found that a fairly modest deformation of this character is one or more regions of the flange will result in a yielding of the flange material beyond its elastic limit in that region, the result being a permanent dent or depression in the flange periphery with a resultant generation of a fluid pressure leak path.

Operational experience has also demonstrated that a too severe tightening of the clamp used to retain a pair of flanges of the nature described can result in the mated reentrant flanges being too forcibly engaged, the ultimate result being an overstressing and collapse of those flanges and their taking of a permanently distorted set. Particularly as related to the reuse of such flanges, a permanent set of this nature can cause a mismatch of the sealing surfaces, permitting the pressures acting internally of the flanges to initiate leak paths therebetween.

SUMMARY OF THE INVENTION

The present invention effectively fulfills the requirements set forth above relative to systems of a character wherein high temperature, high pressure environments are encountered. It is also effective in preventing preassembly or operational overstressing of pressure sealing flanges and concomitant introduction of pressure leak paths. It provides a highly efficient and rugged structure for a great variety of applications consistent with operational and reliability requirements while minimizing its weight, an important consideration for aircraft applications.

The primary features of novelty in this invention relate to a reinforcing ring affixed to the interior of the noted tubular collar portion and extending axially toward a reentrant portion of the flange and into close proximity therewith, together with the inward extension of the reentrant flange portion to a minor diameter substantially matching that of the reinforcing ring. The positions of these two parts are so proximate as to substantially obviate the possibility of the reentrant flange portion being overstressed by its deflection toward the reinforcing ring; i.e., the reentrant flange portion comes into engagement with the reinforcing ring prior to its reaching an overstressed condition.

It will, therefore, be noted that a primary object of this invention is to provide a safety barrier for the reentrant flange portion of a pressure flange, thereby preventing its being overstressed.

Another object of the invention is to provide a flange wherein relatively rough handling prior to or during assembly will not result in a deterioration of the ultimate sealing capabilities of the flange.

A further object of the present invention is to provide a protective structure in an adjacently spaced relationship from the free end of a reentrant metallic flange used in fluid pressure systems, that structure adapted for engagement by and protection of that free end.

A related object of the invention is to provide in conjunction with a reinforcing ring in a metallic flange configuration, pressure paths for free passage of pressurized fluids into pressure action regions for the assurance of sealing.

Other objects of the invention will become apparent from the following description taken in conjunction with the accompanying drawings.

DETAILED DESCRIPTION OF THE DRAWINGS

It will be understood that the present invention is capable of construction and operation in a variety of configurations within the intended scope of the invention. The drawings accompanying this specification and the description which follows are representative only of the basic features of the invention, the intention being to encompass all modifications, equivalents and alternative constructions falling within the spirit and scope of the invention as expressed in the appended claims.

Figure 1:
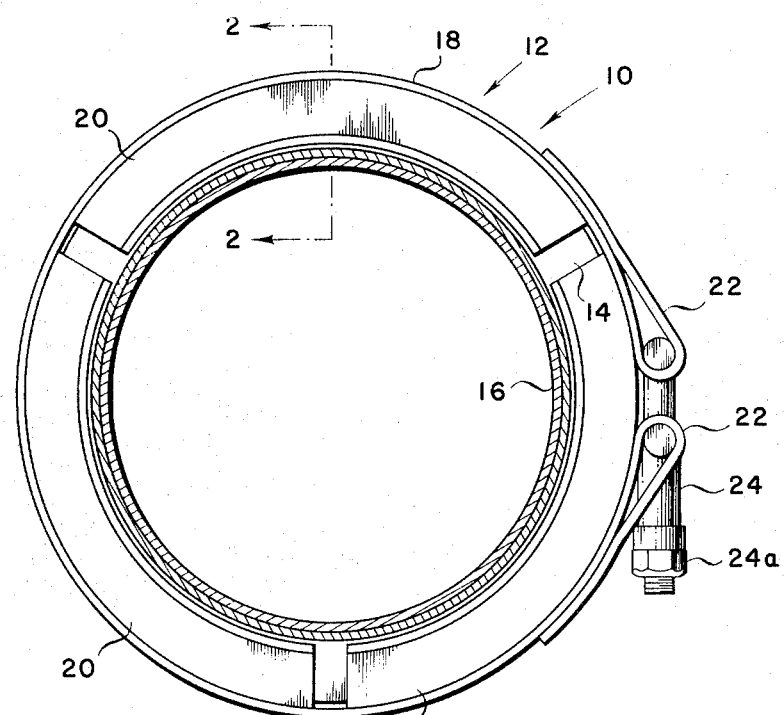
FIG. 1 is an elevation view showing the coupling combination of this invention, as installed in a duct system.

Referring now to FIG. 1, there is illustrated therein a basic pressure line coupling incorporating the novel features of this invention. Generally indicated by the numeral 10, this coupling comprises and a clamp 12 and a pair of flanges 14 (one only shown) installed upon a tubular member 16. The illustrated clamp 12 is conventional, it being recognized that a variety of clamp, rather than the one specifically illustrated, could be used. The clamp 12, however, includes an external strap member 18 surrounding a plurality of semi-circular clamp segments 20. Included as integral extensions of the strap member 18 are a pair of loops 22 which fold back and are appropriately attached by welding, riveting or other conventional techniques to the external periphery of the strap member 18. These loops 22 retain the conventionally constructed elements of a trunnion member 24 which is utilized to connect and tighten the clamp 12 about the flanges 14. It is not intended that novelty resides in the clamp element per se, or any of the components thereof, as described relative to this invention.

Figure 2:
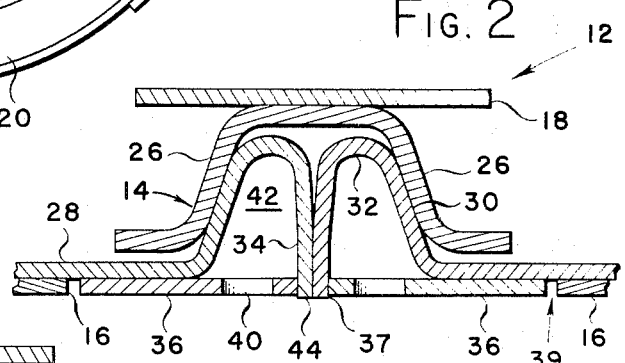
FIG. 2 is an enlarged sectional view taken along line 2—2 of FIG. 1 and showing the coupling of this invention installed in an operational mode.
Figure 3:
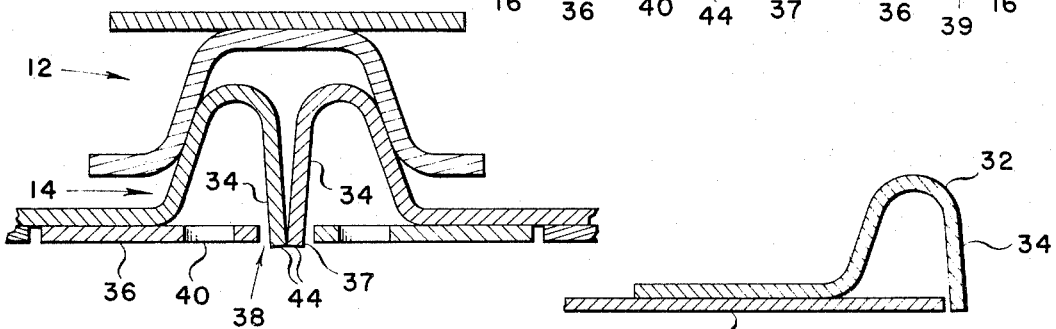
FIG. 3 is a cross-sectional illustration of the FIG. 2 configuration wherein the clamp is only partially installed, the flanges being in their pre-installation configuration.

As best illustrated in FIGS. 2 and 3, the clamp segments 20 define a plurality of channeled annuli of frusto-conical cross-section with side walls 26 which, upon moving radially inward, will exert a wedging action against the mating surfaces to be described of the flanges 14, forcing them axially toward one another and into axial alignment.

Concerning the flanges 14, it will be understood that they are preferably identical to one another in configuration. They may be formed integrally with the ducting of the system of which they form a part, substantially as illustrated in FIG. 3. In the usual instance, however, they are formed integral with a foreshortened tubular portion or collar 28 such that the total flange assembly 14 can be made as a unit and suitably welded, bonded, or otherwise attached to a separate conduit 16. The following discussion will be directed to a configuration so structured.

Referring to FIG. 2, extending generally outward at an obtuse angle from the collar 28 is a side wall 30, that angle substantially matching the angle of the side wall 26 of the clamp 12. Extending generally inward from the side wall 30 through an appropriately turned section 32 is a depending reentrant flange portion 34 which, in its manufactured condition, is distended outward at an acute angle from the side wall 30 to define with that side wall a frustro-conical section. This flange portion 30 includes a built-in spring memory which causes its return to this shape upon the release of deflecting forces, at least to the extent that the metal from which that flange is made is not overstressed and thereby permanently deformed.

Figure 5:
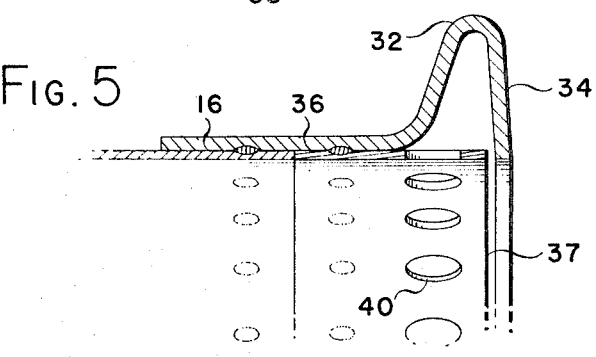
FIG. 5 is a cross-sectional view of a flange of this invention having a narrow angle frustro-conical configuration.

The flanges 14 may be made from any suitable metallic materials so long as such materials are comPatible with the environments within which the flanges are intended to function. For example, aluminum is suitable for certain relatively low temperature or pressure applications, while inconel is regularly used for high temperature or pressure applications. Titanium, carbon steels, nickel alloys and other materials are also usable. Certain applications wherein the temperatures, pressures, system fluids, etc., are appropriate also permit the use of fiberglass and the other non-metallic materials. It will also be recognized that the turned section 32 can be designed with either a tight bend, substantially as illustrated in FIG. 5, or with the greater radius illustrated in the other drawings.

Attached to the inner periphery of the collar 28, usually by welding or bonding techniques, is a reinforcing ring 36. Again, as more specifically illustrated in FIG. 4, the reinforcing ring may accomplish its intended function as a mere extension of the conduit 16.

Figure 6:
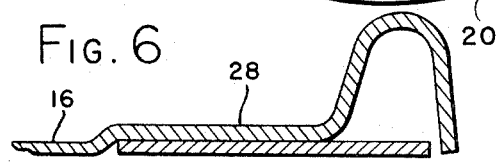
FIG. 6 is a cross-sectional view of the flange wherein the tubular collar is integral with the conduit.
Figure 4:
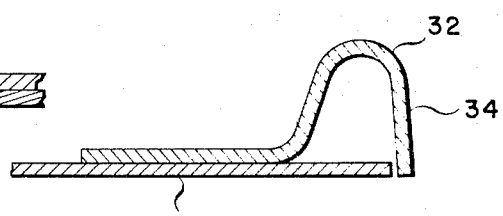
FIG. 4 is a sectional view of a flange of this invention having a wide angle frustro-conical configuration.

The reinforcing ring 36 extends axially from the collar 28 toward the depending flange 34. It terminates in a generally spaced relation from the depending flange 34, as best illustrated in FIGS. 3–5. The distance between the extremity of the reinforcing ring 36 and the depending flange 34, in the non-deflected flange orientation, may vary with the materials used, the width of the flange, its height and other design-related factors. Nevertheless, it has been found that for most standard applications a gap of from 0 to approximately 0.050 inches is suitable. The width of gap 38 is also dependent in part upon the flare of the depending flange 36, that flare although not so limited, being preferably within the approximate range of ½° to 6° from the vertical; i.e., a line perpendicular to the axis of the coupling. The preferred range is 2° ± 1°. The collar 28 is sometimes manufactured integral with the conduit 16, the reinforcing ring 36 being appropriately secured internally thereof, essentially as illustrated in FIG. 6.

A plurality of holes or cutouts 40 are provided through the reinforcing ring 36 near its end 37 so as to reduce weight and provide a free passage of pressures between the conduit passage and the pressure region 42 within the frustro-conical section of the flange 14. Thus, pressure may be freely applied to that region 42 to facilitate pressure actuation of the depending flange portion 34 and to force it into intimate sealing relation with its mated flange.

It will be recognized, nevertheless, that it is sometimes desirable to utilize the reinforcing ring 36 without the holes 40, thereby obviating the possibilities of sonic whistles. A similar reduction of tendencies toward inducing turbulance within the conduit passage and pressure drop through the joint is also provided by virtue of the existence of such holes. In such event, although the pressure is usually not equalized with system pressure as rapidly in the pressure region 42 as when the holes 40 do exist, such pressurization does, nevertheless, progress through any remaining portion of the gap 38, even after the clamp 12 is tightened, so as to accommodate the above described pressure actuation. It is also sometimes acceptable to provide modest depression across the end 37 of the ring 36 for this purpose. The reinforcing ring also tends to provide some degree of thermal isolation for the flange face, since it effectively prevents the hot gases within the duct from impinging directly upon the back side of the flange face.

The conduit 16 may terminate with a gap 39 between it and the reinforcing ring 36, as in FIG. 2, or it may abut the end of the reinforcing ring 36 so as to provide a definite contact or "hit home" recognition in installing the flange 14 upon the conduit. The latter procedure also provides additional structural support for the flange by virtue of such engagement. This relationship is best illustrated in FIG. 5.

Considerations relating to maximizing structural integrity and minimizing disturbance of fluid flow within the system make desirable the maintenance of the minor diameter 44 of the depending flange 34 the same as the internal diameter of the reinforcing ring 36. When so constructed, a full engagement between the extremity of the reinforcing ring 36 and the internal surface of the depending flange 34 is facilitated upon maximum deflection of the depending flange 34. This assures that there will be no possibility of such flange deflection causing the minor diameter 44 of the depending flange to be forced over the reinforcing ring 36 or, since the reinforcing ring 36 is also positioned in such close proximity to the depending flange 34 as to prevent the overstressing of the spring factor inherent in the flange 34, that an undesirable overstressing of the flange can occur.

When the clamp 12 is tightened over a pair of flanges 14, as illustrated in FIG. 2, it is usual, although not mandatory, that the depending flanges 34 are forced into engagement with their respective reinforcing rings 36. Thus, it will be immediately apparent that the described proximate ring-to-flange relationship prevents the flanges from being deflected in an amount sufficient to result in their elastic limits being exceeded. The reinforcing rings 36, therefore, act as control members for protection of the depending flanges 34.

Operational assembly of the coupling 12 is accomplished by bringing the two flange halves 14 into approximate axial alignment and encircling them with the clamp 12, the trunnion 24 being appropriately engaged to secure the assembly. As the trunnion nut 24a is tightened, the diameter of the clamp 12 is reduced and the side walls 26 are moved into forcible radial wedging engagement with the external surfaces of the side walls 30.

It will be noted, as shown in FIG. 3, that upon initial engagement of the clamp 12 with the flanges 14, the first mutual contact of those flanges takes place at their minor diameter or tip 44. Since the flanges 34 incorporate a spring factor, they tend to resist further axially convergent movement. It is notable that while the flanges are so engaged, it is most desirable that they be axially aligned with accuracy. Nevertheless, the flanges of this invention will accommodate a reasonable axial misalignment or mismatch of the sealing flanges 34 and still maintain a seal. A proper seal has been observed to be maintained in the presence of a transverse mismatch on the order of one-sixteenth of an inch regardless of the diameter of the conduit coupling.

Continued tightening of the trunnion nut 24a causes the side walls 26 of the clamp 12 to be moved inward responsive to the axial pressures imparted by the clamp 12, from the position of FIG. 3 to that of FIG. 2, the faces of the depending flanges 34 being moved into ever tighter and more extensively contacting relationships. The flanges 34 are simultaneously deflected to the substantially perpendicular positions of FIG. 2, thereby establishing a circular plane of sealing engagement at the tips of their sealing faces.

Upon achievement of this substantially perpendicular flange orientation relative to the axis, the depending flanges 34 engage the reinforcing rings 36 and are held firmly in an essentially fixed relationship. At this time a complete structural engagement along the entire length of the coupling is accommodated so as to result in what is virtually a solid or rigidized coupling, the load carrying capability of this coupling being thereby greatly enhanced. The coupling, when so loaded, may be appropriately referred to as a compression-loaded coupling. It is at this time ready for the acceptance of the pressure which it is intended to withstand.

The preparation of the sealing faces of the depending flanges 34 may be accomplished by machining, grinding, lapping, or other suitable manufacturing techniques. They may also be tapered as appropriate, substantially as shown in the Hill et al. patent mentioned above. It is, nevertheless, desirable that where machining is used it be concentric machining, rather than spiral machining, so as to prevent the generation of spiral-out leak paths.

It is sometimes desirable that the flange of this invention be mated with flanges upon components wherein the flanges have the envelope dimensions similar to the present flange, but the interior is of solid construction. The present flange is readily adaptable to accept such a mated relationship.

It will be recognized that the compressive load or force applied to the sealing faces of the flanges 34 may be considered to be partly in view of the inherent spring loading of the depending flange 34 and partly due to the external preload of the clamp 12. Additionally, the application of pressure by the operation of the system to which this connector is applied results in an "inflation" of the flanges and the additional forcible engagement of the sealing surfaces against one another, thereby further facilitating a leak-tight seal.

Tests accomplished relative to the flanges of this invention have demonstrated an ability to accommodate greater flange pressures responsive to tightening of the clamp member than have prior art flanges. Thus, the flanges can be preloaded to greater extent than prior art flanges, inherently increasing their sealing capability. Successful utilization of the flanges in a coupled assembly over temperatures ranging from minus 80° F. under cold soak condition, to extreme heats of 1,100° F. at pressures over 1,000 PSIG have been sustained without structural damage to the flanges or the assembly and with a maintenance of acceptable sealing qualities.

Therefore, what I claim as patentably novel is:

1. A flange assembly for a conduit coupling comprising:
    a tubular collar;
    a flange member upon one end of said tubular collar and including;
        divergent-reentrant flange portions, said reentrant portion defining a flexible depending lip member, and
    a ring affixed to the interior of said tubular collar, extending toward said lip member and terminating in adjacently spaced relation therefrom such that said reentrant flange portion, when deflected into a position substantially perpendicular to said ring, contacts the end of said ring.

2. A flange assembly according to claim 1 wherein the spacing between said ring and said lip member is sufficient to permit flexing and sealing of said lip member relative to a companion sealing member and insufficient to result in imparting a permanent set in said lip member responsive to such flexing.

3. The flange assembly according to claim 2 wherein said tubular collar is attachable to the conduit exteriorly thereof, and
    said ring has an internal diameter substantially equal to the internal diameter of the conduit.

4. The flange assembly according to claim 2 wherein
    said tubular collar is integral with the conduit, and
    said ring is rigidly affixed to the interior of said tubular collar.

5. A flange assembly for a conduit coupling comprising;
    a tubular collar;
    a flange member upon one end of said tubular collar and including;
        divergent-reentrant flange portions, said reentrant portion defining a flexible depending lip member,
    a ring affixed to the interior of said tubular collar, extending toward said lip member and terminating in adjacently spaced relation therefrom,
    said ring including at least one hole therethrough in spaced relation from an extremity adjacent said lip member, and
    the spacing between said ring and said lip member being sufficient to permit flexing and sealing of said lip member relative to a companion sealing member and insufficient to result in imparting a permanent set in said lip member responsive to such flexing.

6. The flange assembly according to claim 2 wherein
    the internal diameter of said ring and the minor diameter of said lip member are substantially equal.

7. The flange assembly according to claim 2 wherein
    said flange member is substantially frustro-conical in cross section, and
    a joinder of said divergent and reentrant flange portions includes a radius of curvature.

8. A flange for sealing pressures internally of a conduit comprising:
    a collar member;
    a divergent flange portion upon one end of said collar member;
    a reentrant flange portion depending from an outer extremity of and flexible with respect to said divergent flange portion;
    a support member internally of the flange and fixed in spaced relation to said reentrant flange portion and contactable by the same when said flange is applied in a sealing relationship, the space between the end of said support member and said
        reentrant flange portion being sufficient to permit flexing of said reentrant flange portion into substantially perpendicular engagement with the end of said support member without a permanent set into such flexed position being imparted to said reentrant flange portion.

9. The flange according to claim 8 wherein
    the internal diameter of said support member and the minor diameter of said reentrant flange portion are substantially equal.

10. The flange according to claim 9 wherein
    said support member includes passage means therethrough, facilitating pressure equalization within the conduit and behind said reentrant flange and lightening said flange.

* * * * *